(12) United States Patent
Chatain

(10) Patent No.: US 6,728,552 B2
(45) Date of Patent: Apr. 27, 2004

(54) MOBILE TELECOMMUNICATIONS TERMINALS

(75) Inventor: David Chatain, Levis St Nom (FR)

(73) Assignee: Sagem S.A., Paris (FR)

( * ) Notice: Subject to any disclaimer, the term of this patent is extended or adjusted under 35 U.S.C. 154(b) by 0 days.

(21) Appl. No.: 09/978,443

(22) Filed: Oct. 15, 2001

(65) Prior Publication Data

US 2002/0090976 A1 Jul. 11, 2002

(30) Foreign Application Priority Data

Oct. 13, 2000 (FR) .............................. 00 13148

(51) Int. Cl.$^7$ ................................................ H04M 1/00
(52) U.S. Cl. ................................ 455/556.1; 455/550.1; 455/420; 455/418; 342/357.06; 342/357.11; 701/207; 701/213; 733/179; 340/990
(58) Field of Search ................................ 455/550, 556, 455/66, 420, 418, 414; 340/990, 462; 342/357.06, 357.11; 701/207, 213; 733/179

(56) References Cited

U.S. PATENT DOCUMENTS

| | | | | |
|---|---|---|---|---|
| 5,323,322 A | * | 6/1994 | Mueller et al. | 701/215 |
| 5,978,738 A | * | 11/1999 | Brown | 702/3 |
| 6,076,044 A | | 6/2000 | Brown | 702/3 |
| 6,204,779 B1 | * | 3/2001 | Berlioz et al. | 340/970 |
| 6,330,457 B1 | * | 12/2001 | Yoon | 455/550 |
| 6,378,808 B1 | * | 4/2002 | Smolders | 244/149 |
| 6,480,121 B1 | * | 11/2002 | Reimann | 340/990 |
| 6,518,918 B1 | * | 2/2003 | Vannucci et al. | 342/357.06 |

FOREIGN PATENT DOCUMENTS

| DE | 29921515 U1 | 2/2000 | ............ H04M/1/00 |
|---|---|---|---|

\* cited by examiner

Primary Examiner—William Trost
Assistant Examiner—Danh C Le
(74) Attorney, Agent, or Firm—Blakely, Sokoloff, Taylor & Zafman

(57) ABSTRACT

A mobile telecommunications terminal including interface means suitable for communicating information to a user, the terminal being characterized in that it includes at least one sensor (4, 5) suitable for measuring a meteorological parameter, the interface means including means (6) enabling the user to access information as a function of said measurement.

21 Claims, 1 Drawing Sheet

MOBILE TELECOMMUNICATIONS TERMINALS

BACKGROUND

1. Field of the Invention

The present invention relates to mobile telephony.

2. Description of the Related Art

Numerous mobile telephony operators offer as a service for their clients, access to weather forecasting servers which can be called in order to obtain information about local weather forecasts.

As a general rule, those servers are audiotel servers and the user can navigate through a menu which is spoken out loud and which enables the user to select the geographical zone of interest.

Systems have recently been proposed which make use of the fact that the position of a mobile telephone in a cellular telecommunications network can be located, even if only approximately. Such systems automatically transmit local weather forecasts to mobile telephones as a function of the locations in which said mobile telephones are to be found.

SUMMARY

The mobile terminal proposed by the invention makes it possible to further refine the local forecasts to which a user can have access, while also continuing to make weather forecasts available to the user even in zones which are not or are no longer covered by the cellular telephone network.

Thus, the invention proposes a mobile telecommunications terminal including interface means suitable for enabling information to be communicated to a user. The mobile telephone includes at least one sensor suitable for measuring a meteorological parameter, the interface means including means enabling the user to access information as a function of said measurement.

Such a mobile terminal is advantageously also provided with the various following characteristics taken singly or in any technically feasible combination:

- at least one sensor is a pressure sensor;
- at least one sensor is a temperature sensor;
- it includes means suitable for processing the measurements performed by the pressure sensor to deduce a weather trend therefrom, with the interface means serving to give access thereto;
- it includes means suitable for processing the measurements performed by the pressure sensor to deduce altimetric information therefrom, with the interface means serving to give access thereto;
- it includes means enabling a reference pressure to be stored on command, relative to which an altitude offset is subsequently calculated by the processor means;
- it is suitable for transmitting information to a server enabling the server to locate the terminal, said server itself being suitable for transmitting weather forecast information to said terminal as a function of locating the terminal when interrogated thereby;
- it includes means for storing information it receives from said server, the interface means including means enabling the user to access information stored in this way or information that is a function thereof; and
- the server transmits local altitude information and the processor means suitable for processing the measurements performed by the pressure sensor to deduce altimetric information are recalibrated as a function of said information.

The invention also provides a system which comprises at least one mobile telecommunications terminal of the above-specified type and a server with which said telephone is capable of dialoguing, said telephone being suitable for transmitting information to said server enabling the server to locate the telephone, the server being suitable for transmitting weather information to the telephone as a function of its location.

BRIEF DESCRIPTION OF THE DRAWINGS

Other characteristics and advantages of the invention appear further from the following description which is purely illustrative and non-limiting and which should be read with reference to the accompanying figures, in which.

DETAILED DESCRIPTION

Figure 1:
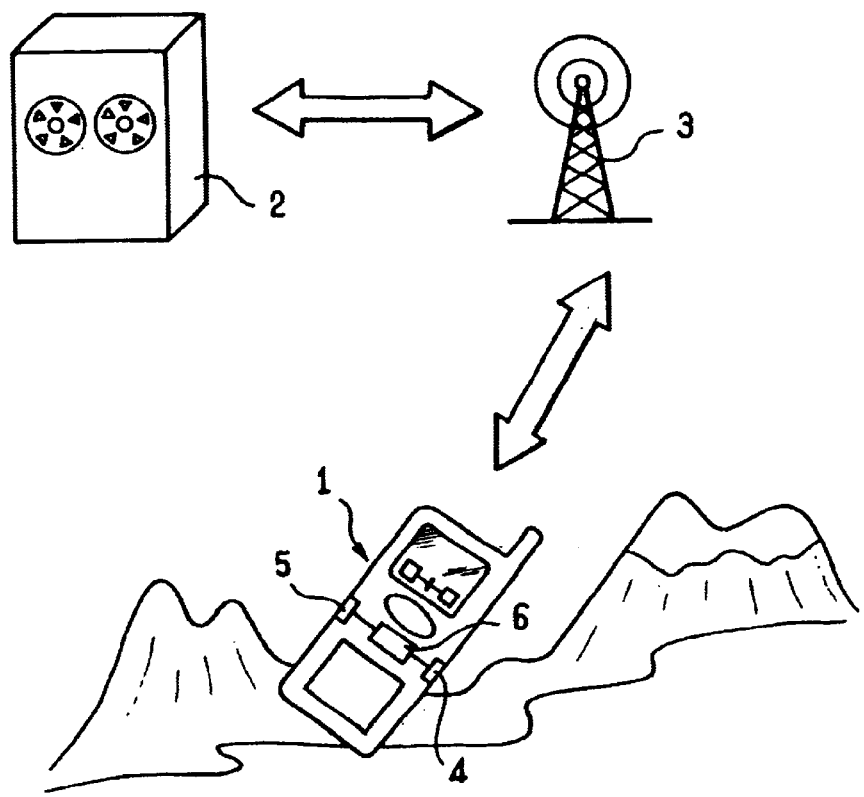
FIG. 1 is a diagram of a mobile terminal constituting one possible embodiment of the invention.

FIG. 1 is a diagram showing a mobile terminal 1 which is suitable for dialoguing with a computer server 2 via a cellular network 3, represented in the figure by a beacon.

The mobile terminal is programmed to send information to the server 2 on a regular basis concerning the cells in which the terminal is to be found.

In particular, it regularly sends information to the server enabling the cell in which it is to be found to be identified, possibly also with information relating to the respective powers of the various signals it is receiving from various beacons of said cell or of adjacent cells.

The server 2 processes the information it receives from the mobile terminal 1 so as to enable it to determine the location of the terminal. This location can be restricted, for example, to identifying the cell in which the mobile terminal 1 is located. Where appropriate, it can also be more precise, particularly when the server receives information from the mobile terminal concerning the power levels of the signals it is receiving from the various beacons surrounding it, with locating techniques based on said power information being well known in themselves.

Thereafter, the server 2 sends weather information to the mobile terminal 1 as a function of the location of said mobile telephone 1.

This information can be general information (temperatures, type of weather for the day, etc.), together with information relating to forecasts over some longer term.

The information is stored in means provided for this purpose in the terminal 1, and the user can access it at any time, e.g. by actuating one or more keys specially dedicated to the weather function, or indeed by scrolling through a menu which appears on the screen of the terminal 1.

By way of example, this information can be accessed by a display on the terminal screen or by issuing a synthesized voice message.

The mobile terminal 1 also includes one or more sensors enabling it to measure local meteorological parameters.

In particular, it includes a pressure sensor 4 and a temperature sensor 5.

It also includes a microprocessor 6 suitable for processing the information received from the weather forecast server 2, and also the pressure and temperature information picked up by the sensors 4 and 5 so a to make it possible, where appropriate, to refine the forecasts sent by the server.

In particular, the way the pressure measured by the sensor 4 varies can be used to indicate a local trend in weather changes.

If the pressure is rising, the user is informed that the trend is towards sunny weather.

If the pressure is falling, the user is informed that the trend is towards overcast weather.

It should also be observed that if the terminal 1 is no longer receiving signals from the network, the sensors 4 and 5 enable the microprocessor 6 to continue supplying the user with weather forecasts based on a weather simulation model.

Figure 2A:
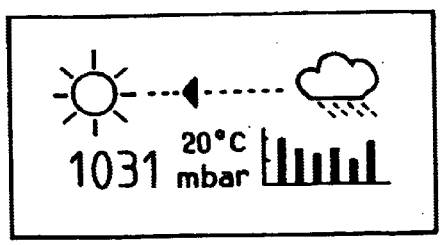
FIGS. 2a and 2b illustrate examples of possible screen displays for the FIG. 1 terminal.

By way of example, and as shown in FIG. 2a, the weather forecast information can be conveyed to the user by display on a screen which shows:
- a temperature value and a pressure value (as measured by the sensors 4 and 5);
- a histogram showing how pressure has varied over several days; and
- a cursor which moves linearly between a symbol representing sunny weather (e.g. an icon representing a sun) and a symbol representing overcast weather (e.g. an icon representing a cloud with rain and/or snow), depending on how fine the weather is.

The position of the cursor between these two symbols is a function of the pressure measured by the sensor 4 and, where appropriate, when the terminal 1 is in a zone having access to the network 3, of information transmitted by the server 2.

The cursor is preferably an arrow or an arrow tip pointing to indicate the current trend in the weather as determined by the microprocessor 6 as a function of the way pressure is varying.

It should also be observed that the local pressure information transmitted by the server 2 is used by the terminal 1 to enable it to recalibrate the pressure sensor 4.

Furthermore, the microprocessor 6 is advantageously programmed to determine altitude as a function of pressure as measured by the sensor 4, thus enabling the terminal 1 to be used as an altimeter.

In particular, means are advantageously provided on the mobile terminal 1, e.g. a dedicated key or a function which can be accessed by making a selection in a menu which is displayed on the screen of the terminal 1, enabling the user to cause a reference pressure to be stored relative to which an offset in altitude Δh is subsequently calculated.

Figure 2B:
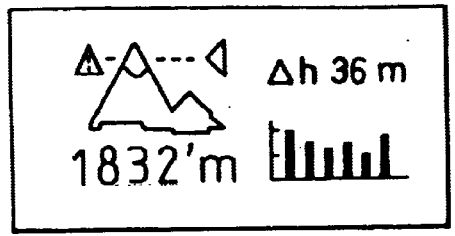

For example, the user can have access to a screen showing (cf. FIG. 2b):
- a histogram showing how pressure has been varying;
- a theoretical altitude relative to sea level; and
- an altitude offset calculated relative to the selected reference pressure.

It should be observed that when the location of the mobile terminal 1 is known sufficiently accurately, provision can be made for the server 2 to transmit precise information concerning the altitude of the location where the terminal 1 is to be found simultaneously with the weather forecast information, the pressure sensor 4 and the altimeter function of the telephone 1 thus being recalibrated whenever data is interchanged between the terminal 1 and the server 2.

As will be understood, the mobile telephone described above has the advantage of enabling a reliable weather forecast to be made available all along a route, and for this to be done continuously regardless of the configuration of the terrain.

The weather forecasting and the altitude information are particularly accurate.

Furthermore, it should be observed that provision can be made for the server 2 to transmit warning messages to the terminal 1 for example in the event of the weather for the location where the telephone is to be found worsening badly. Receiving such a warning message and displaying it for the user then has priority over all other functions of the telephone.

What is claimed is:

1. A cellular phone comprising:
a pressure sensor to provide a pressure information;
cellular communications means for communicating with other phones via a cellular network, said cellular communications means capable of communicating with a server via the cellular network, wherein said server is configured to determine an altitude information of the cellular phone based on signals transmitted by the cellular communications means and transmit the altitude information to the cellular communications means;
a processor coupled to the pressure sensor and the cellular communications means, wherein, when the cellular phone is not within a zone covered by the cellular network, the processor is capable computing a current altitude information based on the altitude information previously transmitted by the server and the pressure information provided by the pressure sensor; and
a user interface coupled to the processor to enable a user to access the current altitude information.

2. A cellular phone according to claim 1, wherein, when the cellular phone comes back into the zone covered by the cellular network, the cellular phone is configured to receive Previously Presented altitude information determined by the server and to use the Previously Presented altitude information to re-calibrate the pressure sensor and the current altitude information.

3. A cellular phone according to claim 1, wherein the server configured to determine a location of the cellular phone based on signals transmitted by the cellular communications means, wherein the server is configured to transmit weather forecast information to the cellular communications means based on the location of the cellular phone.

4. A cellular mobile phone according to claim 1, further comprising a temperature sensor.

5. A cellular mobile phone according to claim 1, wherein the processor processes the measurements performed by the pressure sensor to deduce a weather trend therefrom, with the user interface serving to give access thereto.

6. A cellular mobile phone according to claim 1, wherein the processor processes the measurements performed by the pressure sensor to deduce altimetric information therefrom, with the user interface serving to give access thereto.

7. A cellular mobile phone according to claim 6, further comprising means for enabling a reference pressure to be stored on command, relative to which an altitude offset is subsequently calculated by the processor.

8. A cellular mobile phone according to claim 1, wherein the cellular communications means is suitable for transmitting information to a server enabling the server to locate the cellular phone, wherein said server is suitable for transmitting weather forecast information to said cellular phone as a function of locating the cellular phone when interrogated thereby.

9. A cellular mobile phone according to claim 8, further comprising means for storing the weather forecast information the cellular communications means receives from said server, the interface means including means enabling the user to access the weather forecast information stored or information that is a function thereof.

10. A cellular mobile phone according to claim 9, wherein the server transmits local altitude information and the processor suitable for processing the measurements performed by the pressure sensor to deduce altimetric information that is recalibrated as a function of said local altitude information.

11. A system comprising:
a cellular network;
a server coupled to the cellular network; and
a cellular phone including a pressure sensor to provide a pressure information, a cellular communications interface to communicate with other phones via the cellular network, the cellular communications interface capable of communicating with the server via the cellular network, wherein the server determines an altitude information of the cellular phone based on signals transmitted by the cellular communications interface and transmits the altitude information to the cellular communications interface, a processor coupled to the pressure sensor and the cellular communications interface, wherein, when the cellular phone is not within a zone covered by the cellular network, the processor is capable computing a current altitude information based on the altitude information previously transmitted by the server and the pressure information provided by the pressure sensor, and a user interface coupled to the processor to enable a user to access the current altitude information.

12. A cellular phone comprising:
a pressure sensor to provide a pressure information;
a cellular communications interface to communicate with other phones via a cellular network, the cellular communications interface capable of communicating with a server via the cellular network, wherein the server determines an altitude information of the cellular phone based on signals transmitted by the cellular communications interface and transmits the altitude information to the cellular communications interface;
a processor coupled to the pressure sensor and the cellular communications interface, wherein, when the cellular phone is not within a zone covered by the cellular network, the processor is capable computing a current altitude information based on the altitude information previously transmitted by the server and the pressure information provided by the pressure sensor; and
a user interface coupled to the processor to enable a user to access the current altitude information.

13. A cellular phone according to claim 12, wherein, when the cellular phone comes back into the zone covered by the cellular network, the cellular phone is configured to receive previously presented altitude information determined by the server and to use the previously presented altitude information to re-calibrate the pressure sensor and the current altitude information.

14. A cellular phone according to claim 12, wherein the server configured to determine a location of the cellular phone based on signals transmitted by the cellular communications interface, wherein the server is configured to transmit weather forecast information to the cellular communications interface based on the location of the cellular phone.

15. A cellular mobile phone according to claim 12, further comprising a temperature sensor.

16. A cellular mobile phone according to claim 12, wherein the processor processes the measurements performed by the pressure sensor to deduce a weather trend therefrom, with the user interface serving to give access thereto.

17. A cellular mobile phone according to claim 12, wherein the processor processes the measurements performed by the pressure sensor to deduce altimetric information therefrom, with the user interface serving to give access thereto.

18. A cellular mobile phone according to claim 17, further comprising a memory to enable a reference pressure to be stored on command, relative to which an altitude offset is subsequently calculated by the processor.

19. A cellular mobile phone according to claim 12, wherein the cellular communications interface is capable of transmitting information to a server enabling the server to locate the cellular phone, wherein said server is capable of transmitting weather forecast information to said cellular phone as a function of locating the cellular phone when interrogated thereby.

20. A cellular mobile phone according to claim 19, further comprising a memory to store the weather forecast information the cellular communications interface receives from said server, the user interface is capable of enabling the user to access the weather forecast information stored or information that is a function thereof.

21. A cellular mobile phone according to claim 20, wherein the server transmits local altitude information and the processor is capable of processing the measurements performed by the pressure sensor to deduce altimetric information that is recalibrated as a function of said local altitude information.

\* \* \* \* \*